(12) United States Patent
Liu

(10) Patent No.: US 12,408,624 B2
(45) Date of Patent: Sep. 9, 2025

(54) FOLDING UNIT STRUCTURE AND PET HOUSE

(71) Applicant: SMART PETS HOME INC, Lakewood, CO (US)

(72) Inventor: Yi Liu, Guangzhou (CN)

(73) Assignee: SMART PETS HOME INC, Lakewood, CO (US)

( * ) Notice: Subject to any disclaimer, the term of this patent is extended or adjusted under 35 U.S.C. 154(b) by 0 days.

(21) Appl. No.: 18/935,395

(22) Filed: Nov. 1, 2024

(65) Prior Publication Data

US 2025/0057110 A1   Feb. 20, 2025

(30) Foreign Application Priority Data

Sep. 25, 2024   (CN) .......................... 202411342957.4

(51) Int. Cl.
*A01K 1/03*   (2006.01)

(52) U.S. Cl.
CPC .................................. *A01K 1/033* (2013.01)

(58) Field of Classification Search
CPC .. B65D 11/1833; B65D 11/18; B65D 5/0254; B65D 5/0005; B65D 5/36; B65D 7/28; B65D 7/26; B65D 9/14; B65D 11/1853; B65D 11/1846; B65D 11/186; A01K 1/033; A01K 1/0353; E04H 15/006; E04H 15/008
USPC .................................................... 220/6, 4.28
See application file for complete search history.

(56) References Cited

U.S. PATENT DOCUMENTS

| | | | | |
|---|---|---|---|---|
| 1,108,289 | A * | 8/1914 | Weiss ....................... | B65D 5/02 |
| | | | | 229/199 |
| 1,160,760 | A * | 11/1915 | Rexford ............... | B65D 5/0254 |
| | | | | 229/199 |
| 2,411,121 | A * | 11/1946 | Wilson ..................... | B65D 9/38 |
| | | | | 217/69 |
| 2,914,210 | A * | 11/1959 | Paston ..................... | B65D 9/24 |
| | | | | 24/570 |
| 2,941,710 | A * | 6/1960 | Smith ...................... | B65D 7/28 |
| | | | | 229/199 |
| 3,006,319 | A * | 10/1961 | Mccrory ............... | A01K 1/0353 |
| | | | | 119/28.5 |
| 3,499,398 | A * | 3/1970 | Murray ................ | B65D 19/385 |
| | | | | 108/53.5 |

(Continued)

FOREIGN PATENT DOCUMENTS

CN   220466028 U   *   2/2024   .........   B65D 11/1866

*Primary Examiner* — Katelyn T Truong

(57) ABSTRACT

The present invention provides a folding unit structure and a pet house. The folding unit structure includes at least one supporting frame and at least one folding frame, wherein the folding frame is arranged on at least one side of the supporting frame; the folding frame includes a plurality of rims and baffle plates; the rims are hinged to the supporting frame; the baffle plates are detachably mounted in the rims; after being folded, the plurality of rims abut against the supporting frame or abut against each other, so that the supporting frame and the folding frame form a rectangle structure as a whole; after being unfolded, the plurality of rims have cross sections with the same area as an area of the supporting frame; and the cross sections are configured to extend to place another supporting frame.

6 Claims, 8 Drawing Sheets

(56) References Cited

U.S. PATENT DOCUMENTS

| | | | | |
|---|---|---|---|---|
| 4,491,231 A * | 1/1985 | Heggeland | ............ | B65D 21/02 |
| | | | | 206/509 |
| 4,585,159 A * | 4/1986 | Travis | ...................... | B65D 5/10 |
| | | | | 220/9.3 |
| 5,080,042 A * | 1/1992 | Rubin | .................. | A01K 15/024 |
| | | | | 119/706 |
| 5,352,149 A * | 10/1994 | Melashenko | ............ | A47G 5/00 |
| | | | | 446/490 |
| 6,394,336 B1 * | 5/2002 | Beneroff | .............. | B65D 5/0005 |
| | | | | 229/101 |
| 7,267,229 B2 * | 9/2007 | Chen | ...................... | B65D 19/06 |
| | | | | 206/386 |
| 7,472,715 B2 * | 1/2009 | Zheng | ..................... | E04H 15/58 |
| | | | | 135/144 |
| 8,870,008 B2 * | 10/2014 | Wu | ........................ | B65D 21/08 |
| | | | | 220/666 |
| 9,635,833 B2 * | 5/2017 | Oeltjen | ................... | A01K 1/034 |
| 10,492,463 B2 | 12/2019 | Deraps | | |
| 11,523,587 B1 * | 12/2022 | Bellman | .................. | A01K 1/03 |
| 11,871,724 B2 | 1/2024 | Zhang | | |
| 2004/0168714 A1 * | 9/2004 | Zheng | ..................... | E04H 15/14 |
| | | | | 135/121 |
| 2004/0216686 A1 * | 11/2004 | Mitchell | ................. | A01K 1/033 |
| | | | | 119/165 |
| 2005/0224494 A1 * | 10/2005 | Heinrichs | ................ | B65D 7/32 |
| | | | | 220/4.28 |
| 2006/0243215 A1 * | 11/2006 | Ho | ......................... | A01K 1/033 |
| | | | | 119/455 |
| 2008/0156276 A1 * | 7/2008 | Denenberg | ........... | A01K 1/0245 |
| | | | | 119/513 |
| 2008/0296308 A1 * | 12/2008 | Barbalho | ........... | B65D 11/1833 |
| | | | | 220/666 |
| 2012/0024820 A1 * | 2/2012 | Geugelin | ............... | B65D 11/18 |
| | | | | 217/40 |
| 2015/0175297 A1 * | 6/2015 | McMahon | ............. | B65D 11/24 |
| | | | | 220/608 |
| 2017/0073107 A1 * | 3/2017 | Nakai | .................. | B65D 88/522 |
| 2017/0129652 A1 * | 5/2017 | Kling | ........................ | G09F 7/18 |
| 2019/0230895 A1 * | 8/2019 | Lin | ........................ | A01K 1/035 |

* cited by examiner

FOLDING UNIT STRUCTURE AND PET HOUSE

CROSS-REFERENCE TO RELATED APPLICATIONS

This application claims priority to Chinese patent application No. 2024113429574, filed on Sep. 25, 2024, which is hereby incorporated by reference in its entirety.

TECHNICAL FIELD

The present invention relates to the technical field of pet houses, and in particular, to a folding unit structure and a pet house.

BACKGROUND

A pet house is a living or resting space designed for pets, which provides a safe and comfortable environment for the pets. Pet houses can be customized according to types, sizes, and habits of pets, usually including indoor pet houses and outdoor pet houses.

The existing invention patent No. CN108552065B discloses a folding-and-assembling-facilitated box body, including a left side plate, a right side plate, a front side frame, a rear side frame, a bottom plate, and a top cover. The left side plate and the right side plate are each formed by connecting two or more edge plates through rotary connectors.

In the above technical solution, to ensure that the pet house can be folded, each of the left side plate and the right side plate are composed of two or more edge plates. Since the edge plates can only be rotated and folded through the rotary connectors, the structure of the pet house is limited to an extent, and it is hard to expand the space of the pet house. Meanwhile, an internal space of the pet house is fixed, making it inconvenient to divide the internal space into a resting region, an activity region, a feeding region, and the like.

SUMMARY

In view of this, the present invention provides a folding unit structure and a pet house, which are convenient for space expansion and have a simple structure, to solve the problem that it is hard to expand a space of an existing pet house.

A technical solution in the present invention is implemented as follows:

In one aspect, the present invention provides a folding unit structure, including at least one supporting frame and at least one folding frame.

The supporting frame is of a through structure, and the folding frame is arranged on at least one side of the supporting frame.

The folding frame includes a plurality of rims and baffle plates; the rims are hinged to the supporting frame; and the baffle plates are detachably mounted in the rims.

After being folded, the plurality of rims abut against the supporting frame, or the rims abut against each other, so that the supporting frame and the folding frame form a rectangle structure as a whole.

After being unfolded, the plurality of rims have cross sections with the same area as an area of the supporting frame; and the cross sections are configured to extend to place another supporting frame.

Based on the above technical solution, preferably, the supporting frame includes two parallel side plates and two parallel connecting plates; each of two ends of the connecting plates presses one of the side plates to form a rectangular frame structure.

The two side plates and the two connecting plates are both hinged with the rims.

Based on the above technical solution, preferably, each rim hinged to each of the side plates includes two parallel longitudinal beams and two parallel cross beams to form a rectangular frame structure.

Wherein one of the longitudinal beams is hinged to the side plate, and has a same length as the side plate.

Each of the two ends of each of the cross beams presses one longitudinal beam; a sum of a length of the cross beam and thicknesses of the two longitudinal beams is a half of a length of each of the connecting plates.

The baffle plates are arranged between the two longitudinal beams and the two cross beams.

Based on the above technical solution, preferably, each rim hinged to each of the connecting plates includes two parallel connecting beams; the two connecting beams are connected through the baffle plates; the connecting beams and the connecting plates have same lengths.

A distance between sides, far away from each other, of the two connecting beams is a half of the length of each side plate.

Based on the above technical solution, preferably, a cross section of each connecting beam is of a square structure, and a cross section of each connecting plate is of a rectangular structure; and a sum of a thickness of one connecting beam and a width of each connecting plate is equal to a width of each side plate; or, a sum of thicknesses of the two connecting beams and a width of each connecting plate is equal to a width of each side plate.

Based on the above technical solution, preferably, one folding frame is arranged on each of two sides of the supporting frame.

In another aspect, the present invention provides a pet house, including the above folding unit structure.

Based on the above technical solution, preferably, a plurality of the folding unit structures are included; each folding unit structure includes a supporting frame and two folding frames; and the folding unit structures are arranged in a stacked, parallel or row structure.

When the folding unit structures are stacked or arranged in parallel, the supporting frames of the plurality of folding unit structures abut against each other, and the folding frames of the plurality of folding unit structures are abutted against each other.

When the folding unit structures are arranged in rows, the supporting frames of the plurality of folding unit structures are staggered with the folding frames.

Based on the above technical solution, preferably, the pet house further includes functional assemblies. The functional assemblies are mounted on the supporting frames and/or the folding frames.

The functional assemblies are used for pets to climb, rest, eat, and entertain.

In still another aspect, the present invention provides another pet house, including the above folding unit structure, and further including an external shell. The external shell covers the folding unit structure; the external shell is connected to the supporting frame and/or the folding frame; and at least one surface of the external shell is of an open structure.

Compared with the prior art, the folding unit structure and the pet house of the present invention have the following beneficial effects:

The supporting frame is configured to mount the folding frame, and the folding frame can be folded to abut against the supporting frame. In this way, the folding unit structure has the advantages of convenience of storage and expansion. After the folding frame is unfolded, the folding frame has the same cross section as the supporting frame. It is convenient to connect the supporting frame of another folding unit structure, which improves the convenience of expansion. By the arrangement of the detachable baffle plates in the rims of the folding frame, it is convenient to partition or connect a space of the folding unit structure, to achieve division of functional regions.

In the supporting frame, the rim hinged to each side plate includes two longitudinal beams and two cross beams, and the rim hinged to each connecting plate only includes two connecting beams. Therefore, after the folding frame is unfolded, the supporting frame will form a rectangular three-dimensional frame-like structure with the four rims of the folding frame, which ensures the structural stability of each part. Meanwhile, parameter control is further performed on the side plates and connecting plates of the supporting frame, as well as the longitudinal beams, cross beams, and connecting beams of the folding frame. This ensures that the supporting frame and the folding frame have neat appearances after being folded, thereby ensuring the convenience of storage.

The pet house is composed of the folding unit structures. To construct the pet house, the folding unit structures can be arranged in a stacked, parallel, or row structure, which facilitates the expansion of the space. Meanwhile, after the folding unit structures are integrated, the detachable baffle plates can connect the internal spaces of the plurality of folding unit structures. Alternatively, some of the baffle plates can be retained, to separate the internal space of the pet house, thereby forming a multifunctional pet house structure and creating an environment suitable for many pets to live. Alternatively, pet houses with internal spaces corresponding to the habits of the pets can be selectively produced according to different types of pets, which effectively improves the applicability of the pet house and ensures the comfort level of living of the pets.

In the structure of the pet house, the functional assemblies can be mounted on the supporting frame and the folding frame for the pets to climb, rest, eat, and entertain, thereby improving the living quality of the pets.

BRIEF DESCRIPTION OF DRAWINGS

To describe the technical solutions in the embodiments of the present invention or in the related art more clearly, the following briefly introduces the accompanying drawings for describing the embodiments or the related art. Apparently, the accompanying drawings in the following description show merely some embodiments of the present invention, and a person of ordinary skill in the art may still derive other drawings from the accompanying drawings without creative efforts.

Figure 1:
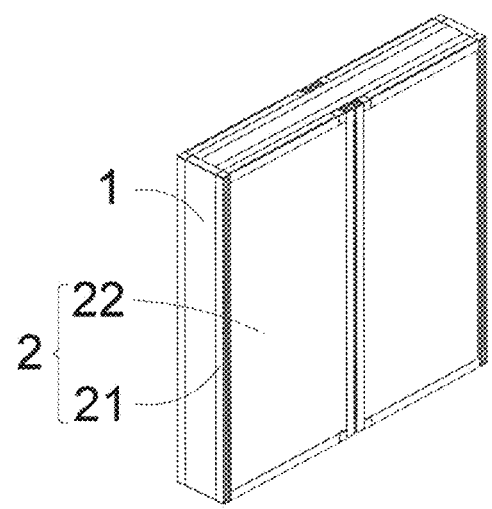
FIG. 1 is a three-dimensional diagram of a folding structure of a folding unit structure according to the present invention.
Figure 2:
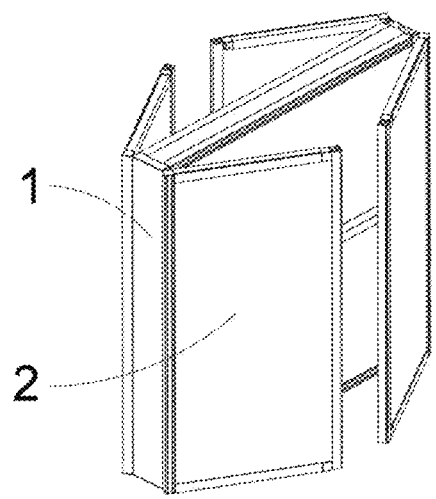
FIG. 2 is a three-dimensional diagram of a preliminarily opened structure of a lateral rim of a folding unit structure according to the present invention.
Figure 3:
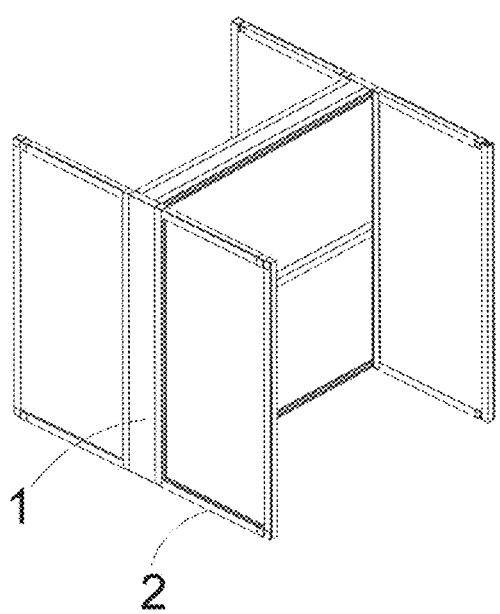
FIG. 3 is a three-dimensional diagram of a completely opened structure of a lateral rim of a folding unit structure according to the present invention.

In the drawings: 1: supporting frame; 11: side plate; 12: connecting plate; 2: folding frame; 21: rim; 211: longitudinal beam; 212: cross beam; 213: connecting beam; 22: baffle plate; 201: cross section; 3: functional assembly; and 4: external shell.

DETAILED DESCRIPTION OF THE EMBODIMENTS

The technical solutions in the embodiments of the present invention will be clearly and completely described below with reference to the embodiments of the present invention, and it is obvious that the described embodiments are only a part of the embodiments of the present invention but not all of them. All other embodiments obtained by a person of ordinary skill in the art based on the embodiments of present disclosure without making creative efforts shall fall within the protection scope of present disclosure.

As shown in FIG. 1 to FIG. 8, a folding unit structure of the present invention includes a supporting frame 1 and a folding frame 2.

A pet house of the present invention includes the above folding unit structure.

In some embodiments, the pet house further includes functional assemblies 3 and an external shell 4.

As shown in FIG. 1 to FIG. 4, the supporting frame 1 is of a through structure, and the folding frame 2 is arranged on at least one side of the supporting frame 1. The folding frame 2 includes a plurality of rims 21 and baffle plates 22; the rims 21 are hinged to the supporting frame 1; the baffle plates 22 are detachably mounted in the rims 21; after being folded, the plurality of rims 21 abut against the supporting frame 1 or abut against each other, so that the supporting frame 1 and the folding frame 2 form a rectangle structure as a whole.

As described in the above structure, the supporting frame 1 is of the through structure, and the folding frame 2 is arranged on a side surface of the supporting frame 1. In this way, after the folding frame 2 is unfolded, the folding frame 2 and the supporting frame 1 will jointly form an accommodating space.

Specifically, the folding frame 2 is composed of a plurality of rims 21. The rims 21 can be switched between a folded form and an unfolded form.

After all the rims 21 are folded, the rims 21 are stacked in parallel with the supporting frame 1, thereby forming the rectangle structure as a whole, which is convenient for storage.

After being unfolded, the rims 21 form the accommodating space with the supporting frame 1. For hollow portions of the rims 21 and the supporting frame 1, the baffle plates 22 can be mounted, to achieve sealing.

Specifically, the baffle plates 22 can be connected to the supporting frame 1 using fasteners such as bolts.

In some embodiments, the supporting frame 1 and the rims 21 are made of an aluminum alloy profile, which facilitates the mounting of the baffle plates 22 through profile grooves and achieves fixing with bolts, thereby improving the convenience of grouping.

Figure 5:
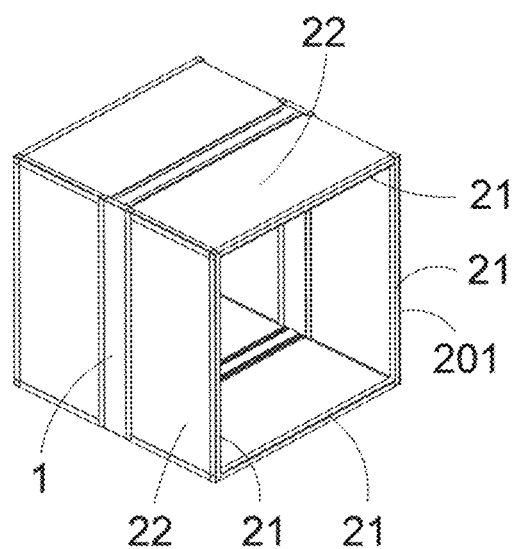
FIG. 5 is a three-dimensional diagram of a completely opened structure of upper and lower rims of a folding unit structure according to the present invention.

As shown in FIG. 5, after being unfolded, the plurality of rims 21 have cross sections 201 with the same area as an area of the supporting frame 1; and the cross sections 201 are configured to extend to place another supporting frame 1.

As described in the above structure, after the plurality of rims 21 are unfolded, edges of the plurality of rims 21 away from the supporting frame 1 form the cross sections 201. In this way, the supporting frame 1 of another folding unit structure can be connected by the cross sections 201, thereby achieving the integration of a plurality of folding unit structures and expanding a space, to satisfy different usage environments.

Specifically, the folding unit can be used in fields such as furniture and pet houses, and aims to achieve an expandable function of the accommodating space.

Figure 4:
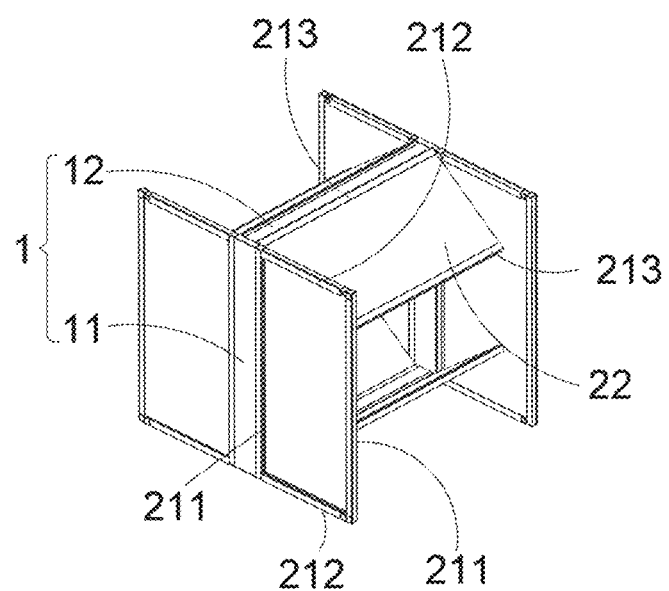
FIG. 4 is a three-dimensional diagram of a preliminarily opened structure of upper and lower rims of a folding unit structure according to the present invention.

As shown in FIG. 4, the supporting frame 1 includes two parallel side plates 11 and two parallel connecting plates 12. Each of two ends of the connecting plates 12 presses one of the side plates 11 to form a rectangular frame structure. The two side plates 11 and the two connecting plates 12 are hinged with the rims 21.

As described in the above structure, the supporting frame 1 is composed of the two side plates 11 and the two connecting plates 12 to form the rectangular frame structure. In this way, the rims 21 of the folding frame 2 can be hinged to the side plates 11 and the connecting plates 12. The rims 21 further use rectangular frame structures, so as to be aligned with the supporting frame 1 after being folded, which ensures the compactness of the structure.

As shown in FIG. 4, each rim 21 hinged to each of the side plates 11 includes two parallel longitudinal beams 211 and two parallel cross beams 212 to form a rectangular frame structure. One of the longitudinal beams 211 is hinged to the side plate 11, and has a same length as the side plate 11. Each of two ends of each of the cross beams 212 presses one longitudinal beam 211. A sum of a length of the cross beam 212 and thicknesses of the two longitudinal beams 211 is a half of a length of each of the connecting plates 12; and the baffle plates 22 are arranged between the two longitudinal beams 211 and the two cross beams 212.

As described in the above structure, to arrange the rims 21, the rims 21 connected to the side plates 11 are formed into the rectangular frame structures composed of the longitudinal beams 211 and the cross beams 212.

Wherein the length of each longitudinal beam 211 is the same as the thickness of each side plate 11, and the sum of the length of each cross beam 212 and the thicknesses of the two longitudinal beams 211 is a half of the length of each connecting plate 12. Therefore, after the rims 21 on the two side plates 11 are closed, areas of the two rims 21 is equivalent to an area of the supporting frame 1, thereby ensuring, to the maximum extent, the volume after the rims 21 are unfolded and making the folding unit structure compact after being folded.

As shown in FIG. 4, each rim 21 hinged to each of the connecting plates 12 includes two parallel connecting beams 213; the two connecting beams 213 are connected through the baffle plates 22; the connecting beams 213 and the connecting plates 12 have same lengths; and a distance between sides, far away from each other, of the two connecting beams 213 is a half of the length of each side plate 11.

As described in the above structure, since the rims 21 hinged to the side plates 11 are formed into the rectangular frame structures by the longitudinal beams 211 and the cross beams 212, only two connecting beams 213 are arranged for each rim 21 hinged to each of the connecting plates 12. After the rim is unfolded, the two connecting beams 213 will form the rectangular frame structure with the cross beams 212 to ensure the structural stability and facilitate the assembling of the baffle plates 22.

In this structure, the baffle plates 22 are made of a rigid material to ensure the structural stability of connection between the two connecting beams 213.

Specifically, the material of the baffle plates 22 includes but is not limited to metal and plastic.

As shown in FIG. 1 to FIG. 5, a cross section of each connecting beam 213 is of a square structure, and a cross section of each connecting plate 12 is of a rectangular structure; and a sum of a thickness of one connecting beam 213 and a width of each connecting plate 12 is equal to a width of each side plate 11; or, a sum of thicknesses of the two connecting beams 213 and a width of each connecting plate 12 is equal to a width of each side plate 11.

As described in the above structure, to ensure that there is no gap between the supporting frame 1 and the folding frame 2 after folding in this folding unit, the cross section of each connecting plate 12 is set as the rectangular structure, and the cross section of each connecting beam 213 is set as the square structure. After the connecting beams 213 are folded, end portions will resist against the side plates 11 of the supporting frame 1. After the longitudinal beams 211 and the cross beams 212 are folded, the longitudinal beams 211 will abut against side surfaces of the side plates 11, and the cross beams 212 will abut against the connecting beams 213, thus ensuring the compactness of the structure.

Meanwhile, the cross section of each connecting beam 213 is set as the square structure for easy assembling, which can play a foolproof role to ensure that the folding frame 2 can be folded and stored normally after being assembled.

In some embodiments, one folding frame 2 is arranged on each of two sides of the supporting frame 1, to achieve the expansion of the space.

In an application process, two folding unit structures can be connected through the folding frame 2.

Specifically, when aluminum profiles are used to construct a frame, bolts can be used to connect and fix plates.

Specifically, the aluminum profiles are constructed in a spliced form, which facilitates the processing of the profiles. When applied, the aluminum profiles are cut according to a specific size of the folding unit structure, so that the folding unit structure can be adaptively spliced, and the convenience of grouping is improved.

For example, in the folding frame 2, each rim 21 is made of a strip-shaped aluminum profile, and each baffle plate 22 is made of a plate-shaped aluminum profile. At this time, corresponding clamping structures are arranged on the rim 21 and the baffle plate 22. During splicing, the clamping structures are clamped to clamping slots to achieve integration of various aluminum profiles. "LEGO" type mounting by a user is achieved, and standardized organization for shipping and production is also facilitated.

In some embodiments of the pet house of the present invention, a pet is stored in a space after the folding unit structure is unfolded.

Figure 6:
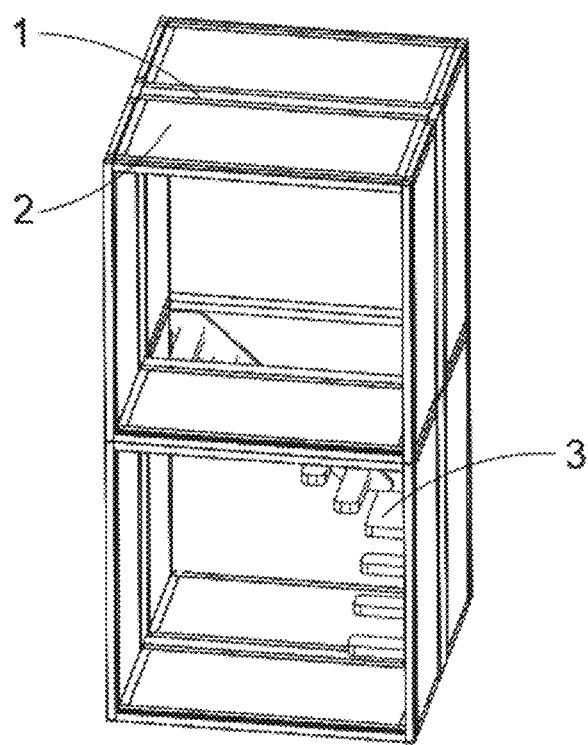
FIG. 6 is a three-dimensional diagram of a functional assembly of a pet house according to the present invention.
Figure 7:
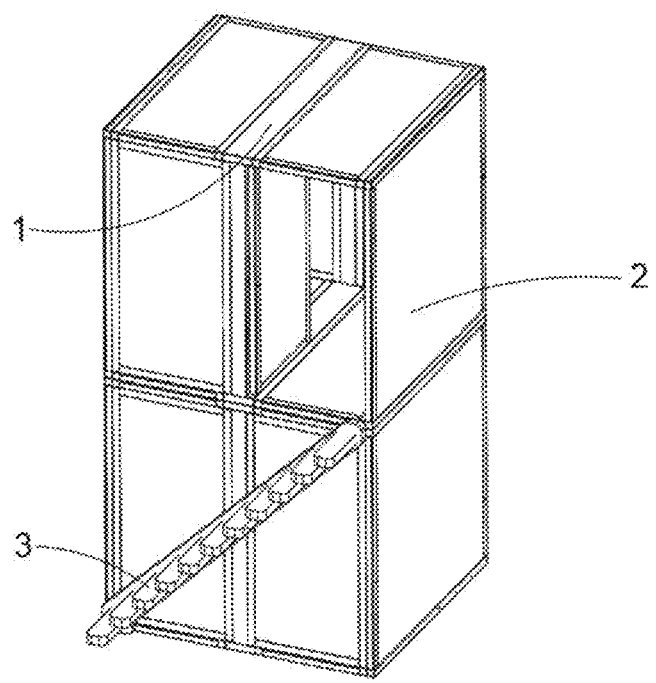
FIG. 7 is a second three-dimensional structural diagram of a functional assembly of a pet house according to the present invention.

Specifically, as shown in FIG. 6 and FIG. 7, a plurality of the folding unit structures are included; each folding unit structure includes a supporting frame 1 and two folding frames 2; the folding unit structures are arranged in a stacked, parallel or row structure; wherein when the folding unit structures are stacked or arranged in parallel, the supporting frames 1 of the plurality of folding unit structures abut against each other, and the folding frames 2 of the plurality of folding unit structures are abutted against each other; and when the folding unit structures are arranged in rows, the supporting frames 1 of the plurality of folding unit structures are staggered with the folding frames 2.

As described in the above structure, the figures show a structure where the folding unit structures are integrated in a stacked/parallel manner. At this time, the supporting frames 1 in the plurality of folding unit structures are connected to each other, and the folding frames 2 are connected to each other, to achieve the integration of the structures.

Specifically, after the plurality of folding unit structures are integrated, the baffle plates 22 on adjacent surfaces of the folding unit structures can be selectively removed or retained to achieve spatial communication or separation, thereby meeting living needs of many pets, or setting different functional spaces for single pets, to meet living needs of the pets.

When the folding unit structures are arranged in rows, the folding frames 2 of the folding unit structures are unfolded for abutment. The supporting frames 1 and folding frames 2 of the plurality of folding unit structures are staggered with each other. There may be one or more folding frames 2 between two supporting frames 1. To expand the folding frames 2, the folding frames 2 can be connected to the supporting frames 1, or the folding frames 2 can be connected to each other.

As shown in FIG. 6 and FIG. 7, functional assemblies 3 are mounted on the supporting frames 1 and/or folding frames 2. The functional assemblies are used for pets to climb, rest, eat, and entertain.

Specifically, the functional assemblies 3 in the illustrated structure are ladders. The functional assemblies 3 can also be configured as pet food bowls, climbing frames, entertainment toys, and the like, to meet the living needs of the pets.

Specifically, the functional assemblies 3 can be mounted in spaces of different folding unit structures, can be mounted in the same space, or can be mounted outside.

In some embodiments, the functional assemblies 3 can be mounted on rigid baffle plates 22.

In some embodiments, the functional assemblies 3 and the baffle plates 22 are integrated into integrated structures.

Figure 8:
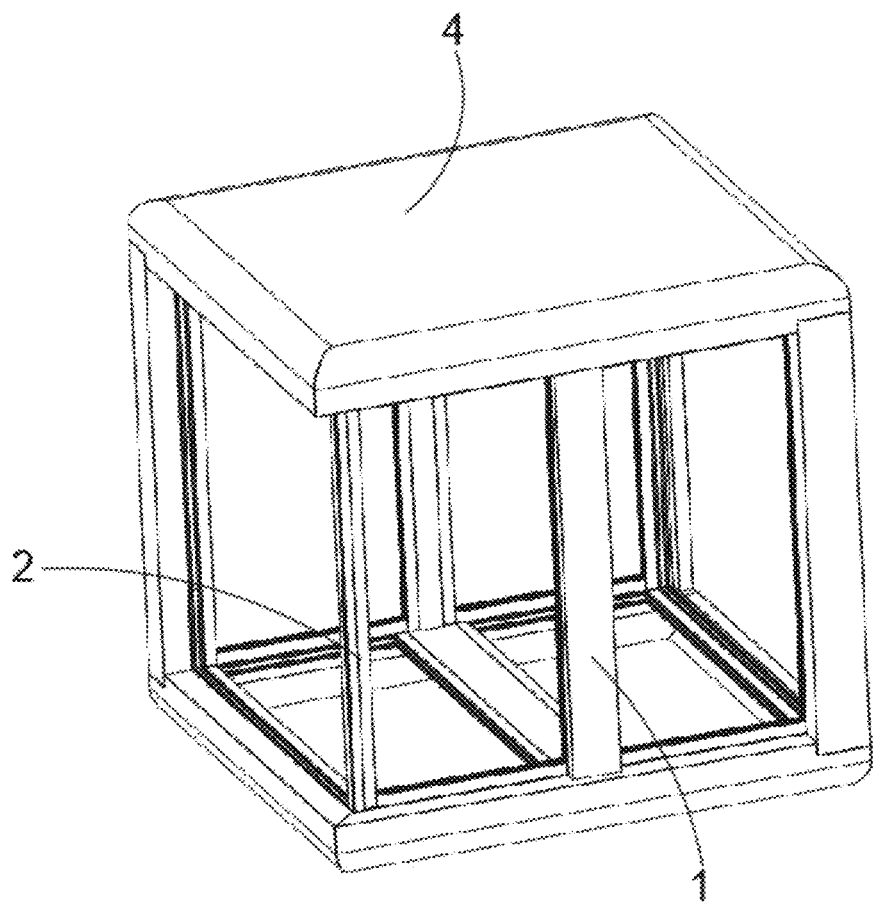
FIG. 8 is a three-dimensional diagram of an external shell of a pet house according to the present invention.

As shown in FIG. 8, the external shell 4 covers the folding unit structures. The external shell 4 is connected to the supporting frames 1 and/or the folding frames 2, and at least one side of the external shell 4 is of an open structure.

As described in the above structure, in some embodiments, for beauty, the external shells 4 can be arranged on the folding unit structures, and the external shells 4 are connected to the supporting frames 1 or the folding frames 2. For a need of a pet for entering and exiting, at least one surface of each external shell 4 is of an open structure.

Specifically, the baffle plate 22 in any frame can be removed for a pet to enter and exit, or a door opening can be provided in the baffle plate 22.

Specific Implementation Steps:

Firstly, the longitudinal beams 211 and the cross beams 212 are used to be integrated into the rims 21, and the connecting beams 213 and the baffle plates 22 are used to be integrated into the rims 21. Then, the plurality of rims 21 are assembled on the supporting frames 1 to integrate the folding frames 2. Later, the baffle plates 22 are arranged according to a use requirement. The plurality of folding unit structures are then integrated, and the functional assemblies 3 are assembled synchronously, to form the pet house.

The external shell 4 can be mounted for beautification and structural strengthening.

Of course, this structure can be applied to fields such as furniture and item storage, without arranging the functional assemblies 3 and the external shell 4.

The above describes the preferred embodiments of the present invention and is not intended to limit the present invention. Any modification, equivalent replacement, and improvement made within the spirit and scope of the present invention shall fall within the protection scope of the present invention.

What is claimed is:

1. A folding unit structure, comprising at least one supporting frame and at least one folding frame, wherein the supporting frame is of a through structure, and the folding frame is arranged on at least one side of the supporting frame; the supporting frame is made of an aluminum alloy profile;

the folding frame comprises a plurality of rims and baffle plates; the rims are hinged to the supporting frame; the baffle plates are detachably mounted in the rims; each rim is made of a strip-shaped aluminum profile, and each baffle plate is made of a plate-shaped aluminum profile;

after being folded, the plurality of rims abut against the supporting frame, or the rims abut against each other, so that the supporting frame and the folding frame form a rectangle structure as a whole;

after being unfolded, the plurality of rims define a cross section with the same area as an area of the supporting frame; and the cross section is configured to connect to another folding unit structure when the folding frame is extended;

wherein the supporting frame comprises two parallel side plates and two parallel connecting plates; each of two ends of the connecting plates presses one of the side plates to form a rectangular frame structure; and the two side plates and the two connecting plates are both hinged with the rims;

wherein each rim hinged to each of the side plates comprises two parallel longitudinal beams and two parallel cross beams to form a rectangular frame structure;

one of the longitudinal beams is hinged to the side plate, and has a same length as the side plate;

each of two ends of each of the cross beams presses one longitudinal beam; a sum of a length of the cross beam and thicknesses of the two longitudinal beams is a half of a length of each of the connecting plates; and the baffle plates are arranged between the two longitudinal beams and the two cross beams;

wherein each rim hinged to each of the connecting plates comprises two parallel connecting beams; the two connecting beams are connected through the baffle plates; the connecting beams and the connecting plates have same lengths; and a distance between opposing outer edges of the two connecting beams is a half of the length of each side plate;

wherein a cross section of each connecting beam is of a square structure, and a cross section of each connecting plate is of a rectangular structure; and a sum of a thickness of one connecting beam and a width of each connecting plate is equal to a width of each side plate; or, a sum of thicknesses of the two connecting beams and a width of each connecting plate is equal to a width of each side plate.

2. The folding unit structure according to claim 1, wherein one folding frame is arranged on each of two sides of the supporting frame.

3. A pet house, comprising the folding unit structure according to claim 1.

4. The pet house according to claim 3, wherein a plurality of the folding unit structures are comprised; each folding unit structure comprises a supporting frame and two folding frames; the folding unit structures are arranged in a stacked, parallel or row structure;

when the folding unit structures are stacked or arranged in parallel, the supporting frames of the plurality of folding unit structures abut against each other, and the folding frames of the plurality of folding unit structures are abutted against each other.

5. The pet house according to claim 3, further comprising functional assemblies, wherein the functional assemblies are mounted on the supporting frames and/or the folding frames; and the functional assemblies are used for pets to climb, rest, eat, and entertain.

6. A pet house, comprising a folding unit structure according to claim 1, and further comprising an external shell, wherein the external shell covers the folding unit structure; the external shell is connected to the supporting frame and/or the folding frame; and at least one surface of the external shell is of an open structure.

* * * * *